United States Patent
Thommana et al.

(10) Patent No.: US 11,653,232 B2
(45) Date of Patent: May 16, 2023

(54) BEYOND-LINE-OF-SIGHT COMMUNICATION

(71) Applicant: Rockwell Collins, Inc., Cedar Rapids, IA (US)

(72) Inventors: John V. Thommana, Cedar Rapids, IA (US); Lizy Paul, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 80 days.

(21) Appl. No.: 17/233,745

(22) Filed: Apr. 19, 2021

(65) Prior Publication Data

US 2022/0256366 A1    Aug. 11, 2022

Related U.S. Application Data

(63) Continuation-in-part of application No. 17/171,324, filed on Feb. 9, 2021.

(51) Int. Cl.
| | | |
|---|---|---|
| *H04W 24/04* | (2009.01) | |
| *H04W 12/63* | (2021.01) | |
| *H04B 7/185* | (2006.01) | |
| *H04W 12/06* | (2021.01) | |
| *H04W 24/02* | (2009.01) | |

(52) U.S. Cl.
CPC ........ *H04W 24/04* (2013.01); *H04B 7/18513* (2013.01); *H04W 12/06* (2013.01); *H04W 12/63* (2021.01); *H04W 24/02* (2013.01)

(58) Field of Classification Search
CPC ..... H04W 24/04; H04W 12/06; H04W 12/63; H04W 24/02; H04B 7/18513; H04B 7/22; H04B 7/1851
See application file for complete search history.

(56) References Cited

U.S. PATENT DOCUMENTS

| | | | |
|---|---|---|---|
| 10,499,307 B2 | 12/2019 | Tenny et al. | |
| 10,747,217 B1 * | 8/2020 | Koenck | ................ G05D 1/0022 |
| 10,784,910 B1 | 9/2020 | Chang et al. | |
| 11,196,157 B1 * | 12/2021 | Bonney | ................. H01Q 3/005 |

(Continued)

FOREIGN PATENT DOCUMENTS

| | | |
|---|---|---|
| CN | 106304053 A | 1/2017 |
| CN | 109831772 A | 5/2019 |

(Continued)

OTHER PUBLICATIONS

Li et al. "Development and Testing of a Two-UAV Communication Relay System", Oct. 13, 2016, MDPI.*

Headquarters, Department of the Army, "Techniques for Tactical Radio Operations", Army Techniques Publication 6-02.53, Feb. 13, 2020, 218 pages.

Maxen, Fredrik, "A Comparative Analysis of Network Approaches for Tactical Wireless Communications, Validated by Joint Communication Simulation System (JCSS) Simulations: A Swedish Perspective", Navel Graduate School, Monterey, CA, Thesis, 2011,110 pages.

(Continued)

*Primary Examiner* — Jae Y Lee
(74) *Attorney, Agent, or Firm* — Suiter Swantz pc llo

(57) ABSTRACT

Cellular communications, such as 5G cellular, may be a primary link between cell phones and a base station. Such cellular communications may be desirable, due to a high link rate. When the cellular communications are denied, a tactical waveform may be used to bridge communications between the cell phones and the base station. The tactical waveform may be transmitted between tactical radios coupled with the cell phones. The waveform may include a line-of-sight waveform. The tactical waveform may also include a beyond-line-of-sight waveform.

13 Claims, 4 Drawing Sheets

(56) References Cited

U.S. PATENT DOCUMENTS

| | | |
|---|---|---|
| 2008/0144815 A1 | 6/2008 | Richards et al. |
| 2009/0310570 A1 | 12/2009 | Smith |
| 2011/0009053 A1 | 1/2011 | Anglin, Jr. et al. |
| 2014/0057566 A1* | 2/2014 | Watfa .................... H04W 48/16 455/41.2 |
| 2014/0233412 A1 | 8/2014 | Mishra et al. |
| 2018/0007497 A1* | 1/2018 | Ahmad ................. H04W 8/005 |
| 2018/0027398 A1* | 1/2018 | Jung ...................... H04L 67/51 455/434 |
| 2018/0039287 A1* | 2/2018 | Shattil .................. G05D 1/0088 |
| 2018/0295655 A1* | 10/2018 | Cavalcanti ............ H04W 76/10 |
| 2019/0159037 A1 | 5/2019 | Byrne |
| 2020/0045758 A1 | 2/2020 | Breuer et al. |
| 2020/0178262 A1 | 6/2020 | Mishra et al. |
| 2020/0314914 A1* | 10/2020 | Roy ...................... H04W 24/10 |
| 2020/0322895 A1 | 10/2020 | Hellhake et al. |
| 2020/0373997 A1 | 11/2020 | Brown |
| 2021/0297842 A1 | 9/2021 | Shrivastava |

FOREIGN PATENT DOCUMENTS

| | | |
|---|---|---|
| EP | 2499754 B1 | 10/2016 |
| NZ | 720150 A | 6/2015 |
| WO | 2013030825 A1 | 3/2013 |

OTHER PUBLICATIONS

Schlienz, J. et al., "Device to Device Communication in LTE", Rohde & Schwarz, Whitepaper D2D Communication—IMA264-0E, Downloaded Mar. 1, 2021, 36 pages.

Extended Search Report in European Application No. 22155963.6 dated Jun. 27, 2022, 9 pages.

Extended Search Report in European Application No. 22155971.9 dated Jul. 2022, 10 pages.

* cited by examiner

BEYOND-LINE-OF-SIGHT COMMUNICATION

CROSS-REFERENCE TO RELATED APPLICATIONS

This application is a continuation-in-part of U.S. patent application Ser. No. 17/171,324, filed Feb. 9, 2021, which is incorporated by reference herein in its entirety.

TECHNICAL FIELD

The present invention generally relates to communication systems, and more specifically to a denial resistant communication.

BACKGROUND

In 2015, the Long-Term Evolution Advanced (LTE-A) Release-12 was released. As part of this release a capability called "Device-to-Device (D2D)" communication was supported to enable public safety operations during emergencies. Since then, this capability has evolved and today it forms the basis for direct device to device communication for supporting V2X (Vehicle to Everything) communication in 5G. Such 5G communications are usable in permissive environments if cyber threats and all security capabilities provided by the 5G standard are enabled. The use of external end-to-end encryption and incorporation of zero trust networking is considered sufficient to operate in permissive environments. However, in a contested theater the 5G waveform has limited useability, because near peer enemies have a capability to deny the 5G waveform.

Therefore, it would be advantageous to provide a device, system, and method that cures the shortcomings described above.

SUMMARY

A system is disclosed, in accordance with one or more embodiments of the present disclosure. In one embodiment, the system includes a first user equipment configured to bidirectionally communicate with a first base station by a first cellular waveform. In another embodiment, the system includes a first tactical radio coupled with the first user equipment by a first connectivity interface to bidirectionally communicate with the first user equipment. In another embodiment, the first tactical radio is configured to communicate by a beyond-line-of-sight waveform. In another embodiment, the system includes a second tactical radio configured to communicate by the beyond-line-of-sight waveform. In another embodiment, the second tactical radio bidirectionally communicates with the first tactical radio by the beyond-line-of-sight waveform. In another embodiment, the system includes a second user equipment configured to couple with the second tactical radio by a second connectivity interface to bidirectionally communicate with the second tactical radio. In another embodiment, the second user equipment bidirectionally communicates with a second base station by a second cellular waveform. In another embodiment, the first user equipment bidirectionally communicates with the second base station by the first tactical radio, the second tactical radio, and the second user equipment.

A system is disclosed, in accordance with one or more embodiments of the present disclosure. In one embodiment, the system includes a first user equipment configured to communicate with a first base station by a cellular waveform. In another embodiment, the system includes a first tactical radio coupled with the first user equipment by a first connectivity interface to bidirectionally communicate with the first user equipment. In another embodiment, the first tactical radio is configured to communicate by a first line-of-sight waveform. In another embodiment, the system includes a second tactical radio configured to communicate by the first line-of-sight waveform. In another embodiment, the second tactical radio bidirectionally communicates with the first tactical radio by the first line-of-sight waveform. In another embodiment, the system includes a third tactical radio configured to communicate by the first beyond-line-of-sight waveform. In another embodiment, the third tactical radio bidirectionally communicates with the second tactical radio by the first beyond-line-of-sight waveform. In another embodiment, the third tactical radio is configured to communicate by a second line-of-sight waveform. In another embodiment, the system includes a fourth tactical radio configured to communicate by the second line-of-sight waveform. In another embodiment, the third tactical radio bidirectionally communicates with the third tactical radio by the second line-of-sight waveform. In another embodiment, the system includes a second user equipment configured to couple with the fourth tactical radio by a second connectivity interface. In another embodiment, the second user equipment bidirectionally communicates with a second base station by a second cellular waveform. In another embodiment, the first user equipment bidirectionally communicates with the second base station by the first tactical radio, the second tactical radio, the third tactical radio, the fourth tactical radio, and the second user equipment.

BRIEF DESCRIPTION OF THE DRAWINGS

Implementations of the concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
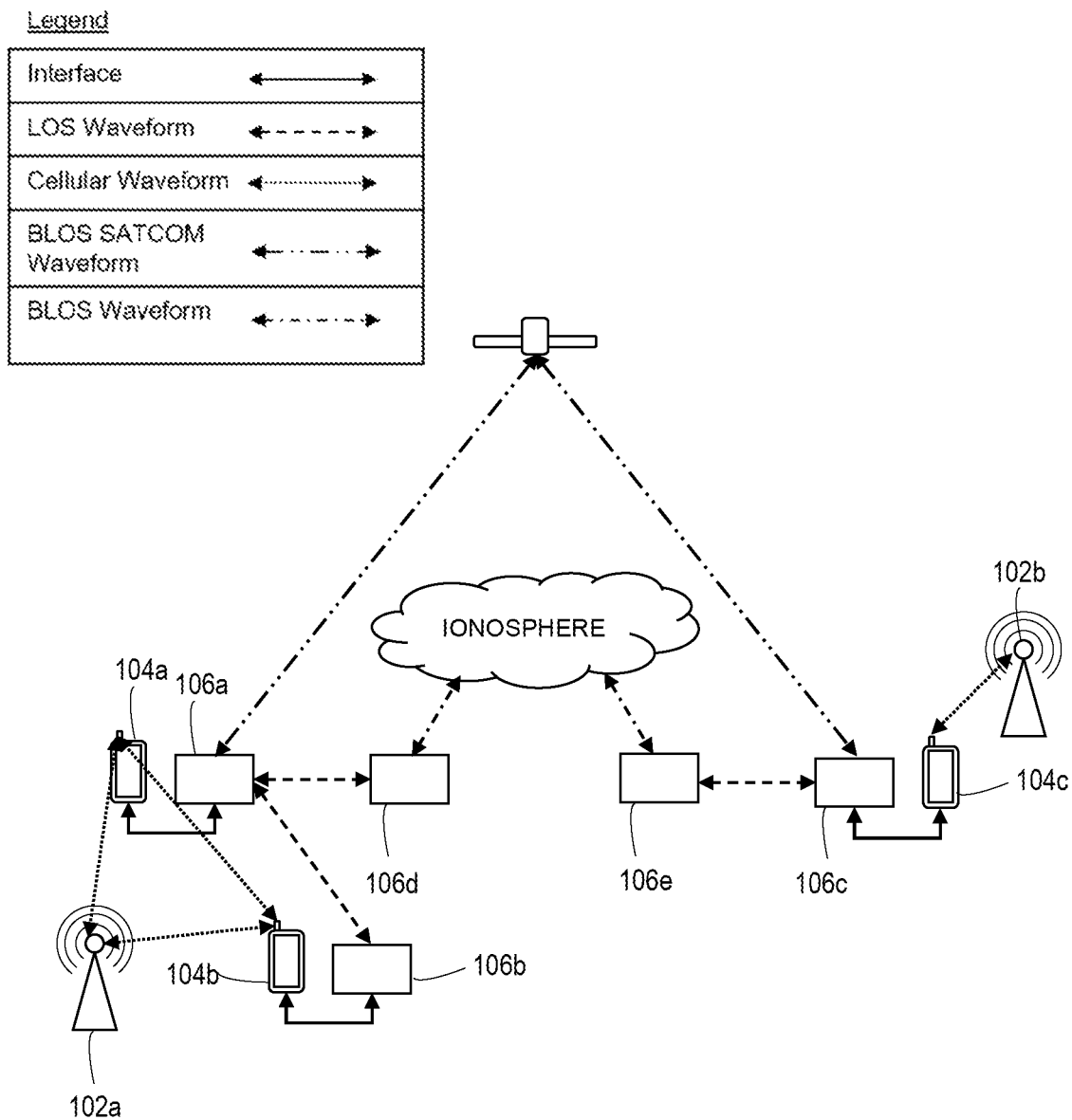
FIGS. 1A-1C depicts a system, in accordance with one or more embodiments of the present disclosure.
Figure 1B:
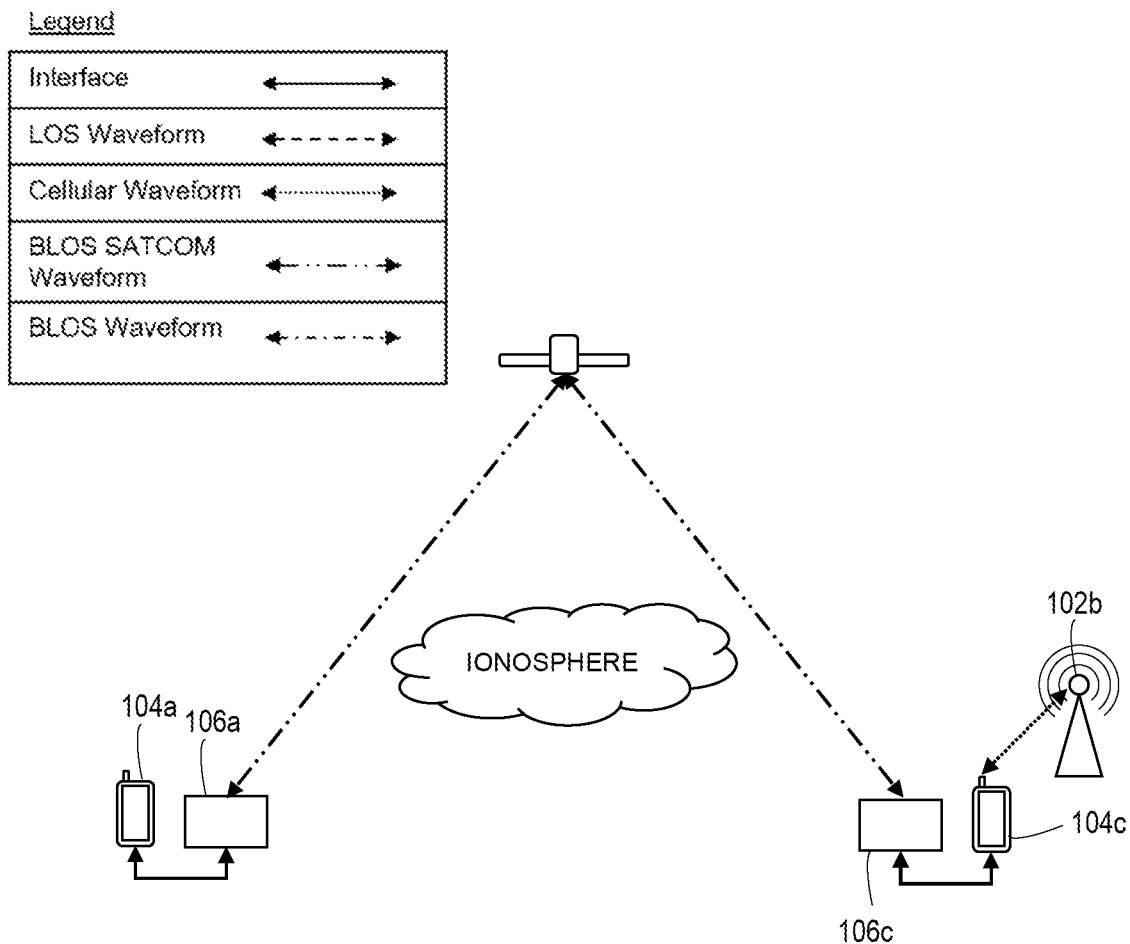
Figure 1C:
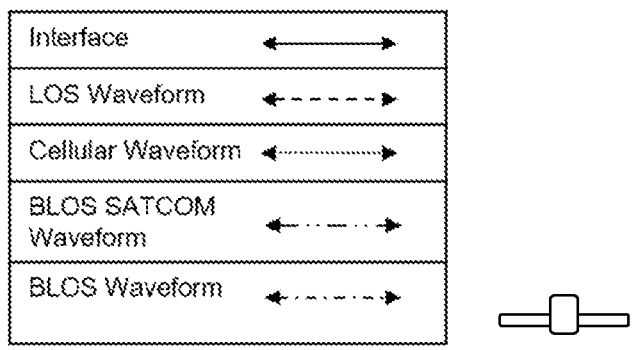
Figure 1C:
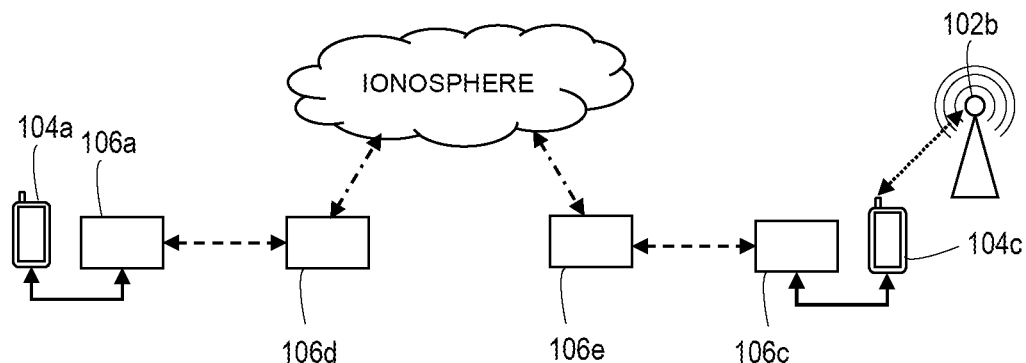

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Figure 2:
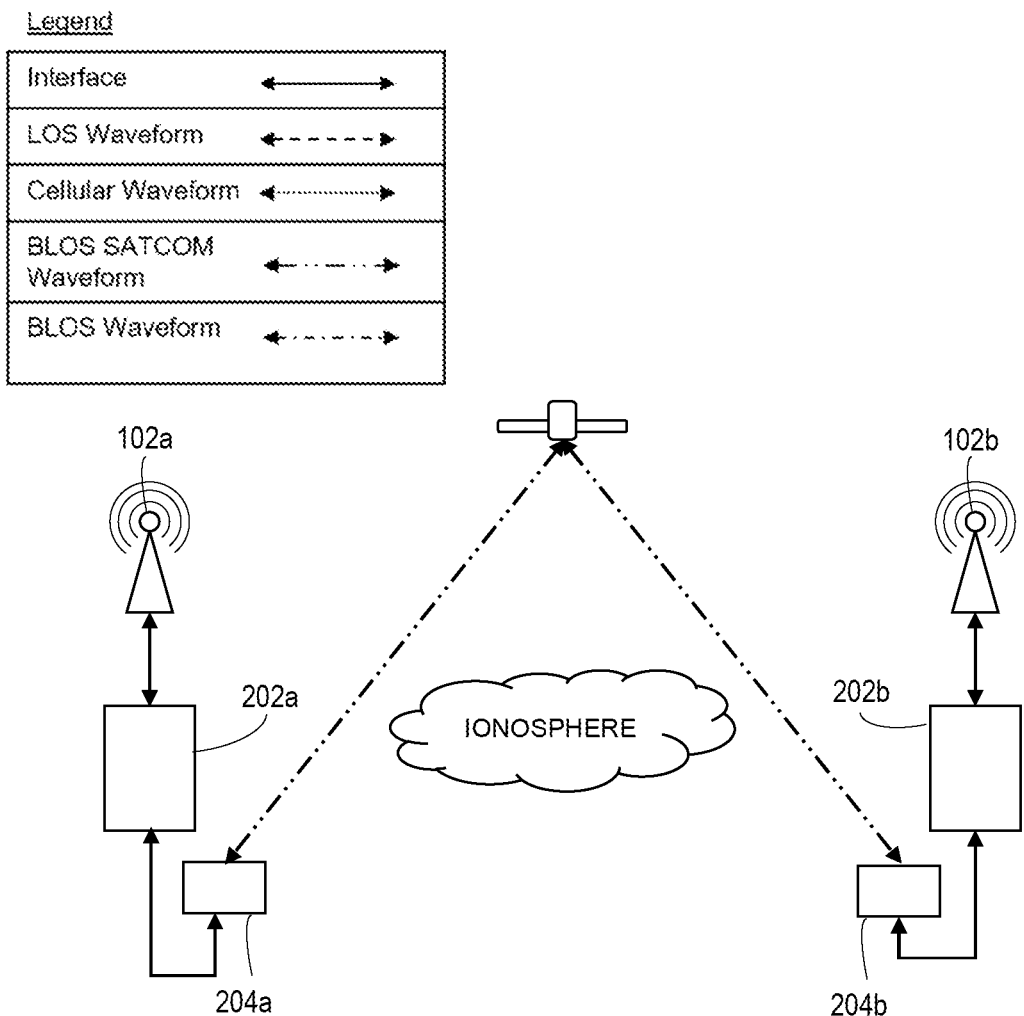
FIG. 2 depicts a system, in accordance with one or more embodiments of the present disclosure.

Reference will now be made in detail to the subject matter disclosed, which is illustrated in the accompanying drawings. Referring generally to FIGS. 1A-2, a networking communication system is described, in accordance with one or more embodiments of the present disclosure.

Cellular communication is used as the last alternative in a Primary, Alternate, Contingent, Emergency (PACE) philosophy employed by the Military, as a waveform of the cellular communication has a low robustness. The present disclosure may enable the use of 5G cellular as the primary link and fall back on alternative communications when the cellular node is subject to denial. Use of the cellular communication as the primary link is desirable because it can sustain much higher throughputs in a spectrally efficient manner than tactical waveforms.

"Device to Device Communication in LTE", by Rohde & Schwarz, is incorporated herein by reference in its entirety.

User Equipment (UEs) may bidirectionally communicate (e.g., transmit and/or receive) messages with a base station. The UEs may include any suitable device for communicating with the base station, such as, but not limited to, a cellular phone or any device equipped for a cellular network connection. The base station may include an Evolved-Terrestrial Radio Access Network (E-UTRAN) Node B station, commonly referred to as eNB. The base station may also include a 3GPP 5G Next Generation Node B base station, commonly referred to as gNB. The UE may communicate with the base station by one or more air interfaces (e.g., an access mode). The air interface may include both a physical layer and a data link layer. For example, the air interface may include an LTE/LTE-A mode, commonly referred to as a Uu interface or Uu. The base station (e.g., eNB or gNB) may then communicate (e.g., transmit and/or receive) messages with a network. The network may include any suitable 3GPP network architecture, such as, but not limited to, an Evolved Packet Core (EPC). The base station may communicate with the network by any suitable interface, such as, but not limited to an S1 interface.

The UEs may also communicate with a Proximity Service (ProSe) Server. The UE may communicate with the ProSe Server by any suitable interface, such as, but not limited to, a PC3 interface. The PC3 interface may include a cellular interface specification to communicate with the ProSe Server which is co-located at the cellular base station, although this is not intended to be limiting. The PC3 interface may be relayed over the Uu interface with the base station routing to the ProSe Server.

A protocol stack for the UEs may include one or more stack layers. The one or more stack layers may include the following layers: a Proximity Service (ProSe) application layer, a Network Layer (IP), a Packet Data Convergence Control (PDCP) layer, a Radio Resource Control (RRC) layer, a Radio Link Control (RLC) layer, a Medium Access (MAC) layer, and a Physical Layer (LTE-PHY). Release 12 D2D communications may use the LTE uplink physical layer for communicating between UEs. The UE may also include one or more of the following layers: a USB-Protocol Layer, a USB-Link Layer, and a USB-Physical Layer. For example, the UE may be configured with any USB standard, such as, but not limited to USB 1.1, 2.0, 3.0, or 3.1. The USB-Protocol Layer may be configured to receive and/or transmit data from the Network Layer (IP), to the USB-Link Layer. Similarly, the USB-Link layer may be configured to receive and/or transmit data from the USB-Protocol Layer, to the USB-Physical Layer. Similarly, the USB Physical Layer may be configured to receive and/or transmit data from the USB-Link Layer, over a connectivity interface.

The UE may also relay messages from one or more UEs with the base station by the Uu interface. For example, UEs may bi-directionally communicate with one another by a Device-to-Device (D2D) Communication. The D2D communication may include a PC5 interface. The services supported by D2D communications is known as Proximity Service (ProSe). The D2D communication between UEs is also known as side-link communication. The Release 12 D2D standard supports D2D discovery, network synchronization, resource management and mobility management protocols required to support proximity services. D2D over LTE is available if UEs are within a range of each other and the cellular band is unjammed. Thus, the UEs may indirectly communicate with the base station by relaying through one or more additional UEs. However, a UE may be prevented from communicating directly with a base station and may similarly be denied from making a D2D side-link with a relay UE.

The UE and a tactical radio may be coupled by a connectivity interface. For example, the connectivity interface may include a PC5 interface. The PC5 interface may be transported over one or more of WiFi, Bluetooth, NFC, Ethernet or USB connection. Depending on a type of UE and a type of tactical radio, an adapter may be required for the transport of the PC5 interface. For example, where the tactical radio includes an AN/PRC-162 tactical radio, the adapter may be required for WiFi, Bluetooth, NFC, or Ethernet connections, but may not be required for USB connections.

Tactical Radios and Tactical Waveforms are generally described in "A Comparative Analysis of Network Approaches For Tactical Wireless Communications, Validated By Joint Communication Simulation System (JCSS) Simulations: A Swedish Perspective", by Fredrik Maxen 2011; and "Techniques for Tactical Radio Operations", Army Techniques Publication (ATP) 6-02.53, both of which are incorporated herein by reference in their entirety.

The tactical radio may be configured to communicate by a waveform. The waveform may include one or more tactical wireless ad hoc network (MANET) waveforms that are anti-jam and capable of operating in a tactical contested environment. The one or more MANET waveforms may include one or more frequency bands. Similarly, the MANET waveforms may include multi-band frequency bands. For example, the tactical radio may include a first channel configured to support a first MANET and a second channel configured to support a second MANET. The first MANET may be of a different robustness as compared to the second MANET. Furthermore, the first MANET may support a different data rate and/or network throughput as compared to the second MANET. The one or more MANET waveforms may be used to transport one or more PC5 messages between tactical radios.

Each channel may host a waveform simultaneously to either improve a redundancy or improve a data transmission rate of a signal. A redundant connectivity may be established by transmitting the same communication in different channels. An improved data-rate connectivity may also be established by transmitting a first packet of data over the first channel, together with a second packet of data over the second channel, where the first packet of data and the second packet of data are different (e.g., by inverse multiplexing and/or by demultiplexing).

In embodiments, the tactical radios are configured to communicate by a line-of-sight (LOS) waveform. By the LOS waveforms, the tactical radio may establish bidirectional communication with other tactical radios in the line-of-sight of the tactical radios. In embodiments, the tactical radios are configured to communicate by a beyond-line-of-sight (BLOS) waveform. By the BLOS waveforms, the tactical radio may establish bidirectional communication with other tactical radios beyond-line-of-sight. For example, the BLOS waveform may include, but is not limited to, a satellite communication waveform (e.g., mobile user objective system (MUOS) waveform, Demand Assigned Multiple Access and Integrated Waveform (DAMA/IW), a commercial waveform (e.g., Iridium), etc.) or a waveform reflected by the earth's ionosphere (e.g., a high frequency (HF) waveform, a wideband high frequency (WBHF) waveform, etc.).

The tactical radios may include any tactical radio, such as, but not limited to, a manpack, a handheld radio, a vehicular radio, or an airborne radio. As may be understood, any combination of single, two-channel, multi-channel tactical radios can be used to create network topologies that are mission specific. For example, the tactical radio may include an army navy PRC-162 manpack. The PRC-162 manpack is a 2-channel software-defined radio (SDR) capable of hosting two simultaneous anti-jam waveforms, one waveform on each channel. The PRC-162 manpack may be configured to communicate in the first channel by a line-of-sight waveform and in the second channel by a beyond-line-of-sight (BLOS) satellite communication (SATCOM) waveform. By way of another example, the tactical radio may include a VRC-126 or VRC-127 radio with a high frequency (HF) mission module. The VRC-126 or VRC-127 radios are cable of hosting line-of-sight waveforms in a first channel and a BLOS high frequency (HF) waveform in a second channel.

The tactical radio may also include one or more of the following protocol layers: a Proximity Service (ProSe) application layer, an Internet Protocol (IP) Relay Layer, a USB-Protocol Layer, a USB-Link Layer, a USB-Physical Layer, a Mesh-Layer 1, a Mesh-Layer 2, and/or, a Mesh-Layer 3. The tactical radio may be configured to communicate with the UE without adjusting a protocol stack of the UE. In this regard, an application layer of the UE may communicate with an IP relay layer of the tactical radio. Any messages transmitted to and/or from the tactical radio over the connectivity interface may be transmitted to and/or from the application layer of the UE.

Cellular nodes (e.g., UEs) in a network may be coupled with a tactical radio capable of operating in a contested area. The tactical radio may be configured to communicate with other tactical radios by a tactical mesh ad-hoc networking waveform for healing a broken or denied cellular connection with a base station. For example, a first UE may bidirectionally communicate with a base station by relaying the communications through a first tactical radio, a second tactical radio, and a second UE. A bridging range between the tactical radios may be dependent on a link coverage range of the mesh waveform. As may be understood, a tactical radio may include any suitable transceiver for transmitting and receiving communications by the mesh waveform.

Referring now to FIG. 1, a system 100 is described in accordance with one or more embodiments of the present disclosure. The system 100 may include one or more base stations 102. The system 100 may include one or more user equipment (UE) 104. The UEs 104 may be configured to communicate with one or more base stations 102 by a cellular waveform. The UEs 104 may also be configured to communicate with other UEs 104 by a D2D side-link. The system 100 may include one or more tactical radios 106. The UEs 104 may be coupled with the tactical radios 106 by a connectivity interface. By the connectivity interface, the UEs 104 may bidirectionally communicate with the associated tactical radio 106. The tactical radios 106 may be configured to communicate by a line-of-sight (LOS) waveform. By the LOS waveform, the tactical radios 106 may be configured to bidirectionally communicate with other tactical radios 106. The tactical radios 106 may thus relay communications between UEs 104, and subsequently the base station 102, for establishing a line-of-sight connection between the UE 104 and the base station 102.

The tactical radios 106 may also be configured to communicate by a beyond-line-of-sight (BLOS) waveform. By the BLOS waveform, the tactical radios 106 may be configured to bidirectionally communicate with other tactical radios 106 which are beyond a line-of-sight of the tactical radio 106. Thus, UEs 104 which are beyond line of sight may bidirectionally communicate by the tactical radios 106. Furthermore, the tactical radios 106 may establish a bidirectional communication between a UE 104 and base station 102 which are beyond line of sight.

A ProSe application layer of the tactical radio 106 may track a mesh network connectivity status of a plurality of tactical radios 106 in a network and may track a cellular connectivity status of UEs 104 connected to the tactical radio 106. The combination of the mesh network connectivity and cellular connectivity strength is used to create a connectivity metric. Based on the connectivity metric, a route to establish bi-directional communications may be established to an available base station 102. The available base station 102 may be within line of sight or beyond line of sight. The ProSe application layer may prioritize bidirectional communications, based on a data rate. For example, the ProSe application layer may prioritize direct cellular communications with a base station, then prioritize a D2D cellular communication routed to the base station, then prioritize a line of sight tactical relay to the base station, then prioritize a beyond line of sight tactical relay to a beyond line of sight base station.

Each tactical radio 106 does not need to include bi-directional BLOS connectivity to establish bidirectional communication with a base station 102 which is beyond line of sight. If at least one node includes bi-directional BLOS connectivity then the available BLOS data rate may be shared between multiple UEs 104. For example, a subset of the tactical radios 106 may include a line-of-sight (LOS) tactical waveform on a first channel and a beyond-line-of-sight (BLOS) waveform on a second channel. By the BLOS waveform on the second channel, a bidirectional BLOS connectivity may be established with a tactical radio 106 which is beyond line of sight, and subsequently to a base station 102 which is beyond line of sight. By the LOS waveform on the first channel, the tactical radios 106 may share communication to be shared with a tactical radio 106 which has established bi-directional BLOS connectivity with the base station.

As may be understood, the system 100 may include various configurations of the base stations 102, the UEs 104, and the tactical radios 106.

For example, the system 100 may include a UE 104a. The UE 104a may be configured to bidirectionally communicate with a base station 102a by a cellular waveform. The UE 104a may be configured to communicate with a UE 104b by a D2D cellular waveform. Should the UE 104a lose a direct cellular communication with the base station 102a, the UE 104a may establish bidirectional communication with the base station 102a by the D2D communication with the UE 104b. However, the D2D communication may be prevented. The UE 104a may also be coupled with a tactical radio 106a by a connectivity interface, for bidirectionally communicating with the tactical radio 106a. The tactical radio 106a may include a multichannel radio configured to communicate in at least two channels. For example, the tactical radio 106a may be configured to communicate by a beyond-line-of-sight waveform in a first channel and communicate by a line-of-sight waveform in a second channel. The system 100 may also include a tactical radio 106b. The tactical radio 106b may be configured to communicate by the line-of-sight waveform. The tactical radio 106a may establish a bidirectional communication with a tactical radio 106b by the LOS waveform. The tactical radio 106b may also be coupled to the UE 104b by a connectivity interface. Thus, the UE 104a may establish bidirectional connectivity with the base station 102a by the tactical radio 106a, the tactical radio 106b, and the UE 104b. However, the UE 104a may be prevented from establishing the connection to the base station 102a (e.g., due to near peer jamming preventing all cellular communication with the base station 102a, a kinetic attack of the base station 102a, etc.).

The system 100 may also include a tactical radio 106c. The tactical radio 106a may be configured to bidirectionally communicate with the tactical radio 106c by the BLOS waveform. For example, the BLOS waveform by which the tactical radio 106a and the tactical radio 106 bidirectionally communicate may include a BLOS SATCOM waveform (as depicted) or a waveform configured to reflect from the ionosphere (e.g., (e.g., a high frequency (HF) waveform, a wideband high frequency (WBHF) waveform, etc.). The tactical radio 106c may be coupled with a UE 104c by a connectivity interface for bidirectionally communicating with the UE 104c. The UE 104c may be configured to communicate with a base station 102b by a cellular waveform. Thus, the UE 104a may establish bidirectional communication with the base station 102b by the tactical radio 106a, the tactical radio 106c, and the UE 104c. See FIG. 1B for an example of such bidirectional communication.

In embodiments, the bidirectional communication between the UE 104a and the base station 102b is established in response to the UE 104a losing bidirectional communication with the base station 102a. For example, the UE 104a may lose bidirectional communication with the base station 102a when the UE 104a losing a direction cellular communication with the base station 102a or loses a D2D side-link with the UE 104b. The UE 104a may also establish the BLOS bidirectional communication with the base station 102b subsequent to the UE 104b losing bidirectional communication with the base station when routing the UE 104a through the tactical radio 106a to the tactical radio 106b by a LOS waveform. Establishing the BLOS bidirectional communication with the base station 102b subsequent to losing the cellular communication or losing the LOS communication may be preferred, because of a higher data rate associated with the cellular communication or LOS waveform, as compared to BLOS communications.

The system 100 may also include a tactical radio 106d. The tactical radio 106d may be configured to bidirectionally communicate with the tactical radio 106a by the LOS waveform. The tactical radio 106d may further be configured to communicate by a BLOS waveform. For example, the BLOS waveform by which the tactical radio 106d communicates may include a waveform reflected by the ionosphere, as depicted. The system 100 may also include a tactical radio 106e. The tactical radio 106e may be configured to bidirectionally communicate with the tactical radio 106d by the BLOS waveform. The tactical radio 106e may further be configured to communicate by a LOS waveform. For example, the tactical radio 106e may bidirectionally communicate with the tactical radio 106c by the LOS waveform. Thus, the UE 104a may establish bidirectional communication with the base station 102b by the tactical radio 106a, the tactical radio 106d, the tactical radio 106e, the tactical radio 106c, and the UE 104c. See FIG. 1C for an example of such bidirectional communication.

In embodiments, the bidirectional communication by the tactical radio 106a, the tactical radio 106d, the tactical radio 106e, the tactical radio 106c, and the UE 104c is established subsequent to the UE 104a losing a bidirectional communication by the tactical radio 106a, the tactical radio 106c, and the UE 104c. For example, the tactical radio 106a and the tactical radio 10c may communicate by a BLOS SATCOM waveform. The tactical radio 106d and the tactical radio 106e may communicate by an ionospheric reflection of a BLOS waveform. The BLOS SATCOM waveform may include a data rate which is higher than the ionospheric reflection of the BLOS waveform. Thus, the proximity service application may use the higher data rate BLOS communication until such communication is lost.

Referring now to FIG. 2, a system 200 is described, in accordance with one or more embodiments of the present disclosure.

Proximity Service resources may be allocated to a Public Land Mobile Network (PLMN). The Department of Defense network may be registered as a single PLMN. In permissive areas, this is a feasible option because every UE 104 can be validated and can gain access to proximity services from any cell tower in the network. In a contested environment, mobile towers may not have the connectivity required to validate the UE 104 and provide service. In such cases, UEs 104 can only obtain services from the tower they are authorized to use.

The UE 104 may be provisioned to communicate on a local network (e.g., by a LOS communication with the base station 102). Where the UE 104 (e.g., UE 104*a*) establishes bi-directional communication by a BLOS waveform with the base station 102 (e.g., base station 102*b*), the UE 104 must be provisioned in such network. Additionally, the UE 104 may be configured to communicate in multiple networks (e.g., by a LOS communication and a BLOS communication). If the two networks are independent, the UE 104 must be provisioned in both of the networks. For example, the base station 102*a* may be connected to a first network and base station 102*b* may be connected to a second network.

In embodiments, the UE 104 may be provisioned in multiple networks by pre-planning. The UE 104 may be configured with multiple static configurations. Based on the network to which the UE 104 is connecting, the proximity service application may select one of the multiple static configurations. In further embodiments, the proximity service application may be configured to simultaneously manage two or more static configurations. By simultaneously managing two or more static configurations, the UE 104 may simultaneously connect to multiple networks (e.g., by the base station 102*a* and the base station 102*b*). Simultaneously connecting to multiple networks may provide one or more of a redundancy in communication or an improved data rate.

In embodiments, the UE 104 may be dynamically provisioned in multiple networks. By dynamically provisioning the UE 104, the UE 104 does not need to be registered to the PLMN to access services of that PLMN. For example, to dynamically authenticate the UE 104, the PLMN proximity server may validate the authenticity of the UE 104 by contacting a proximity server 202 of a home network of the UE 104. This may be supported by the bidirectional connectivity of both the LOS network and the BLOS network. The proximity server 202 may be coupled with the base station by an interface, such as, but not limited to, a PC4 or an S1 interface. For example, a proximity server 202*a* may be coupled with the base station 102*a* and a proximity server 202*b* may be coupled with the base station 102*b*. The base station 102*b* may receive a communication request from the UE 104*a* by BLOS routing (see FIGS. 1B, 1C, for example). Upon receiving the request, the proximity server 202*b* may request various authentication information from the proximity server 202*a* for dynamically authenticating the UE 104*a*. The proximity server 202*b* may receive the authentication information from the proximity server 202*a*. Upon authenticating the UE 104*a*, the serving proximity server 202*b* may forward the parameters or configurations to the UE 104*a*. The parameters may be forwarded over the BLOS or LOS network. The parameters forwarded by the serving proximity server may include, but are not limited to, Group identification (ID), multicast addresses, radio resource parameters, or security parameters.

To support the dynamic validation, a node 204 (e.g., tactical radio 106) may be connected to the proximity server 202. The node 204 may be configured to communicate by a LOS or BLOS waveform. In this regard, the node 204 may communicate with other nodes 204 for relaying the information between the proximity servers 202. The node 204 may be coupled with the proximity server by an interface, such as, but not limited to, a PC3 interface. For example, node 204*a* may be coupled with proximity server 202*a* for bidirectionally transmitting various authentication information. Similarly, the node 204*b* may be coupled with proximity server 202*b* for bidirectionally transmitting various authentication information. The nodes 204*a*, 204*b* may bidirectionally communicate with each other by a BLOS SATCOM waveform. Thus, the proximity server 202*a* may bidirectionally communicate with the proximity server 202*b* for sharing authentication information for the UE 104. The proximity server 202*a* may also communicate with the proximity server 202*b* by a wireline connection (not depicted).

It is to be noted that the specific order of steps in the foregoing disclosed methods are examples of exemplary approaches. Based upon design preferences, it is understood that the specific order of steps in the method can be rearranged while remaining within the scope of the present disclosure. It is believed that the present invention and many of its attendant advantages will be understood by the foregoing description. It is also believed that it will be apparent that various changes may be made in the form, construction, and arrangement of the components thereof without departing from the scope and spirit of the present disclosure. The form herein described being an explanatory embodiment thereof.

What is claimed:

1. A system comprising:
   a first user equipment configured to bidirectionally communicate with a first base station by a first cellular waveform;
   a first tactical radio coupled with the first user equipment by a first connectivity interface to bidirectionally communicate with the first user equipment, wherein the first tactical radio is configured to communicate by a beyond-line-of-sight waveform;
   a second tactical radio configured to communicate by the beyond-line-of-sight waveform, wherein the second tactical radio bidirectionally communicates with the first tactical radio by the beyond-line-of-sight waveform;
   a second user equipment configured to couple with the second tactical radio by a second connectivity interface to bidirectionally communicate with the second tactical radio, wherein the second user equipment bidirectionally communicates with a second base station by a second cellular waveform, wherein the first user equipment bidirectionally communicates with the second base station by the first tactical radio, the second tactical radio, and the second user equipment;
   a first proximity server coupled to the first base station;
   a second proximity server coupled to the second base station; wherein the second proximity server is configured to dynamically authenticate the first user equipment by communicating with the first proximity server; wherein the second proximity server is configured to forward one or more parameters to the first user equipment by the bidirectional communication between the first user equipment and the second base station after authenticating the first user equipment.

2. The system of claim 1, wherein the first user equipment bidirectionally communicates with the second base station in response to the first user equipment losing bidirectional communication with the first base station.

3. The system of claim 2, further comprising:
   a third tactical radio configured to communicate by a line-of-sight waveform, wherein the first tactical radio is configured to communicate by the line-of-sight waveform, wherein the first tactical radio bidirectionally communicates with the third tactical radio by the line-of-sight waveform; and a third user equipment coupled with the third tactical radio by a third connectivity interface to bidirectionally communicate with the third tactical radio, wherein the third user equipment bidirectionally communicates with the first base station by a third cellular waveform, wherein the first user equipment bidirectionally communicates with the first base station by the first tactical radio, the third tactical radio, and the third user equipment.

4. The system of claim 3, wherein the first user equipment bidirectionally communicates with the second base station subsequent to the third user equipment losing the bidirectional communication with the first base station.

5. The system of claim 2, wherein the first user equipment includes at least two static configurations, a first static configuration for the first base station and a second static configuration for the second base station, wherein a proximity service application of the first user equipment or the first tactical radio selects the second static configuration when the first user equipment loses connectivity with the first base station.

6. The system of claim 1, wherein the first user equipment includes at least two static configurations, a first static configuration for the first base station and a second static configuration for the second base station, wherein a proximity service application of the first user equipment or the first tactical radio is configured to manage the at least two static configurations for simultaneously connecting with the first base station and the second base station.

7. The system of claim 1, wherein the beyond-line-of-sight waveform includes a satellite communication waveform.

8. The system of claim 1, wherein the beyond-line-of-sight waveform comprises at least one of a high frequency waveform or a wideband high frequency waveform.

9. A system comprising:
a first user equipment configured to communicate with a first base station by a cellular waveform;
a first tactical radio coupled with the first user equipment by a first connectivity interface to bidirectionally communicate with the first user equipment, wherein the first tactical radio is configured to communicate by a first line-of-sight waveform;
a second tactical radio configured to communicate by the first line-of-sight waveform, wherein the second tactical radio bidirectionally communicates with the first tactical radio by the first line-of-sight waveform, wherein the second tactical radio is further configured to communicate by a first beyond-line-of-sight waveform;
a third tactical radio configured to communicate by the first beyond-line-of-sight waveform, wherein the third tactical radio bidirectionally communicates with the second tactical radio by the first beyond-line-of-sight waveform, wherein the third tactical radio is configured to communicate by a second line-of-sight waveform;
a fourth tactical radio configured to communicate by the second line-of-sight waveform, wherein the third tactical radio bidirectionally communicates with the fourth tactical radio by the second line-of-sight waveform;
a second user equipment coupled with the fourth tactical radio by a second connectivity interface, wherein the second user equipment bidirectionally communicates with a second base station by a second cellular waveform, wherein the first user equipment bidirectionally communicates with the second base station by the first tactical radio, the second tactical radio, the third tactical radio, the fourth tactical radio, and the second user equipment;
a first proximity server coupled to the first base station; and
a second proximity server coupled to the second base station; wherein the second proximity server is configured to dynamically authenticate the first user equipment by communicating with the first proximity server; wherein the second proximity server is configured to forward one or more parameters to the first user equipment by the bidirectional communication between the first user equipment and the second base station after authenticating the first user equipment.

10. The system of claim 9, wherein the fourth tactical radio is configured to communicate by a second beyond-line-of-sight waveform, wherein the first tactical radio is configured to communicate by the second beyond-line-of-sight waveform, wherein the first tactical radio bidirectionally communicates with the fourth tactical radio by the second beyond-line-of-sight waveform, wherein the first user equipment bidirectionally communicates with the second base station by the first tactical radio, the fourth tactical radio, and the second user equipment.

11. The system of claim 10, wherein the first beyond-line-of-sight waveform comprises at least one of a high frequency waveform or a wideband high frequency waveform, wherein the second beyond-line-of-sight waveform comprises a satellite communication waveform.

12. The system of claim 11, wherein the first user equipment establishes bidirectional communication with the second base station by the first tactical radio, the fourth tactical radio, and the third user equipment when the first user equipment loses bidirectional communication with the second base station by the first tactical radio, the fourth tactical radio, and the third user equipment.

13. The system of claim 9, further comprising:
a fifth tactical radio configured to communicate by a third line-of-sight waveform, wherein the first tactical radio is further configured to communicate by the third line-of-sight waveform, wherein the first tactical radio bidirectionally communicates with the fifth tactical radio by the third line-of-sight waveform; and
a third user equipment coupled with the fifth tactical radio by a third connectivity interface to bidirectionally communicate with the fifth tactical radio, wherein the third user equipment is configured to bidirectionally communicate with the first base station by a third cellular waveform, wherein the first user equipment bidirectionally communicates with the first base station by the first tactical radio, the fifth tactical radio, and the third user equipment.

\* \* \* \* \*